(12) United States Patent
Barouni Ebrahimi et al.

(10) Patent No.: US 9,734,147 B2
(45) Date of Patent: *Aug. 15, 2017

(54) CLUSTERING REPETITIVE STRUCTURE OF ASYNCHRONOUS WEB APPLICATION CONTENT

(71) Applicant: International Business Machines Corporation, Armonk, NY (US)

(72) Inventors: Mohammadreza Barouni Ebrahimi, Ottawa (CA); Obidul Islam, Kanata (CA); Iosif V. Onut, Ottawa (CA)

(73) Assignee: International Business Machines Corporation, Armonk, NY (US)

(*) Notice: Subject to any disclaimer, the term of this patent is extended or adjusted under 35 U.S.C. 154(b) by 288 days.

This patent is subject to a terminal disclaimer.

(21) Appl. No.: 14/499,348

(22) Filed: Sep. 29, 2014

(65) Prior Publication Data

US 2016/0092566 A1    Mar. 31, 2016

(51) Int. Cl.
*G06F 17/30* (2006.01)

(52) U.S. Cl.
CPC .... *G06F 17/30011* (2013.01); *G06F 17/3033* (2013.01); *G06F 17/30598* (2013.01); *G06F 17/30896* (2013.01)

(58) Field of Classification Search
CPC ........... G06F 17/3033; G06F 17/30598; G06F 17/30896
See application file for complete search history.

(56) References Cited

U.S. PATENT DOCUMENTS

| 2012/0166936 | A1 | 6/2012 | Ayoub et al. | |
|---|---|---|---|---|
| 2013/0091414 | A1* | 4/2013 | Barkol | G06F 17/3089 715/234 |
| 2014/0173744 | A1* | 6/2014 | Borohovski | G06F 21/577 726/25 |
| 2015/0287047 | A1* | 10/2015 | Situ | G06Q 30/0201 705/7.29 |

OTHER PUBLICATIONS

Benjamin et al., "A Strategy for Efficient Crawling of Rich Internet Applications", ICWE'11 Proceedings of the 11th International Conference on Web Engineering, pp. 74-89, © Springer-Verlag Berlin Heidelberg 2011.

(Continued)

*Primary Examiner* — Scott A Waldron
(74) *Attorney, Agent, or Firm* — Daniel R. Simek

(57) ABSTRACT

A processor determines whether a DOM includes a repetitive pattern of a combination, formed by a tag of a leaf node and a tag of a parent node of the leaf node. Determining the repetitive pattern of the combination, the processor identifies a first inner cluster is identified by collapsing multiple instances of the repetitive pattern into a single instance. The processor generates a LSH signature for the single instance of the repetitive pattern. The processor determines an outer cluster, based on grouping one or more inner clusters, as part of a section rooted at a source node of the DOM, in which the source node is a parent node of the one or more inner clusters. Determining that a pair of outer clusters are near repetitive, the processor limits web content exploration to one of the pair of outer clusters.

18 Claims, 7 Drawing Sheets

(56) References Cited

OTHER PUBLICATIONS

Bezemer et al., "Automated Security Testing of Web Widget Interactions", Report TUD-SERC-2009-011, Delft University of Technology, Software Engineering Research Group, Technical Report Series, This paper is a re-print of "Automated Security Testing of Web Widget Interactions", In Proceedings of the 7th joint meeting of the European Software Engineering Conference and the ACM SIGSOFT Symposium on the Foundations of Software Engineering (ESEC/FSE'-09), Research Papers, ACM, 2009.

Cai et al., "Extracting content structure for web pages based on visual representation", APWeb'03 Proceedings of the 5th Asia-Pacific web conference on Web technologies and applications, pp. 406-417, Springer-Verlag Berlin, Heidelberg © 2003.

Choudhary et al., "Crawling rich internet applications: the state of the art", CASCON '12 Proceedings of the 2012 Conference of the Center for Advanced Studies on Collaborative Research, pp. 146-160, IBM Corp., Riverton, NJ, USA, © 2012.

Dincturk et al., A Statistical Approach for Efficient Crawling of Rich Internet Applications, ICWE 2012 Proceedings of the 12th International Conference on Web Engineering, pp. 362-369, © Springer-Verlag Berlin Heidelberg 2012.

Duda et al., "AJAX Crawl: Making AJAX Applications Searchable", ICDE ' 09 IEEE 25th International Conference on Data Engineering, Mar. 29-Apr. 2, 2009, pp. 78-89, © 2009 IEEE.

Duda et al., "AJAXSearch: Crawling, Indexing and Searching Web 2.0 Applications", PVLDB '08, Aug. 23-28, 2009, Auckland, New Zealand, pp. 1440-1443, Copyright 2008 VLDB Endowment, ACM.

Mesbah et al., "Crawling AJAX by Inferring User Interface State Changes", ICWE ' 08 Eighth International Conference on Web Engineering, pp. 122-134, © 2008 IEEE.

Mesbah et al., "Invariant-Based Automatic Testing of AJAX User Interfaces", ICSE '09 IEEE 31st International Conference on Software Engineering, May 16-24, 2009, Vancouver, Canada, pp. 210-220, © 2009 IEEE.

Roest et al, "Regression Testing Ajax Application: Coping with Dynamism", 2010 Third International Conference on Software Testing, Verification and Validation, pp. 127-136, © 2010 IEEE.

"A method to automatically detect widgets and widget-like structures on a webpage", An IP.com Prior Art Database Technical Disclosure, Authors Disclosed Anonymously, IPCOM000222859D, Oct. 25, 2012, pp. 1-4.

U.S. Appl. No. 13/911,306 entitled "Identifying Unvisited Portions of Visited Information", Filed Jun. 6, 2013.

"Clustering Repetitive Structure of Asynchronous Web Application Content", U.S. Appl. No. 14/,728,064, filed Jun. 2, 2015, pp. 1-41.

IBM Appendix P, list of IBM patents or patent applications treated as related, pp. 1-2, dated Jun. 3, 2015.

* cited by examiner

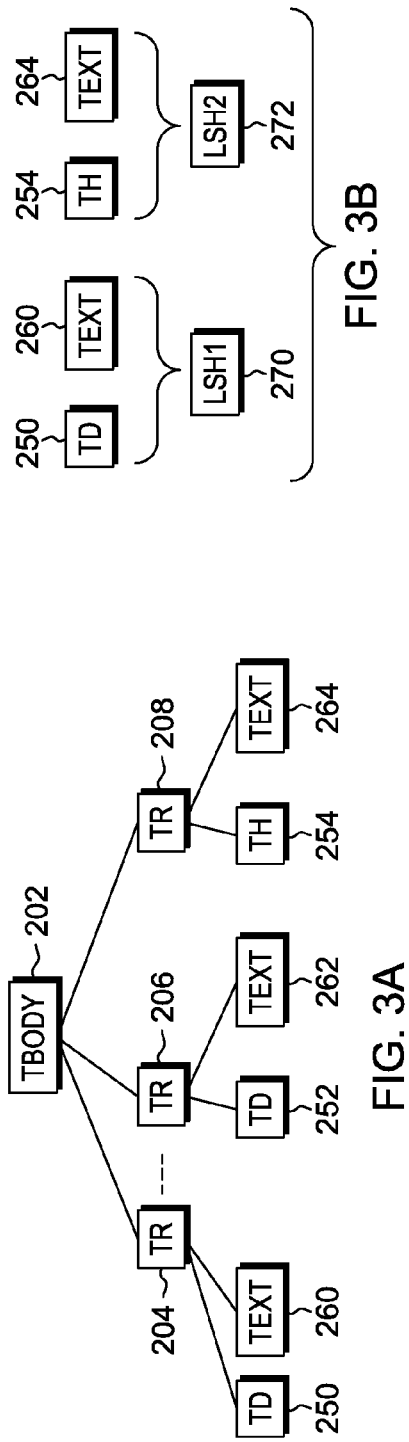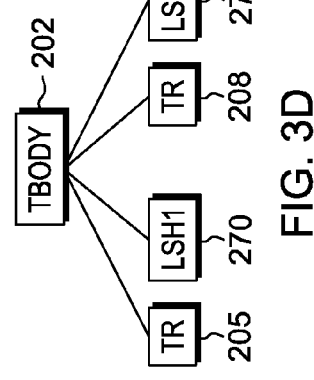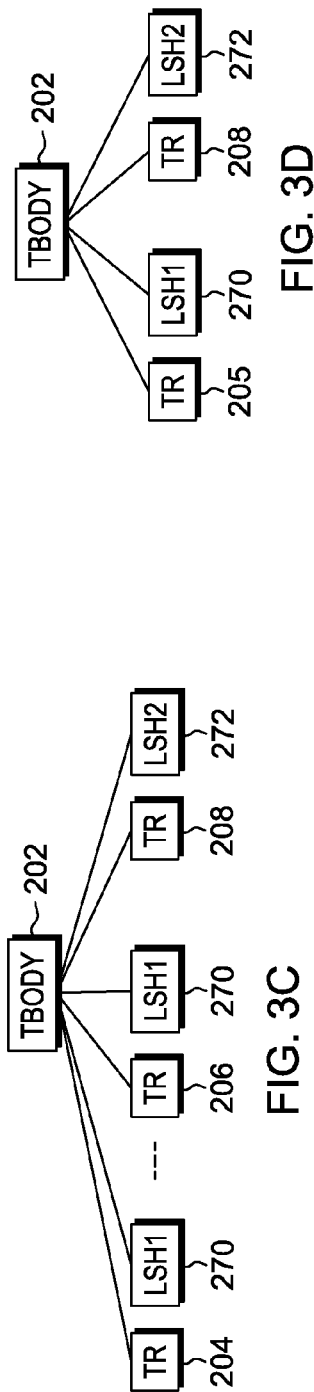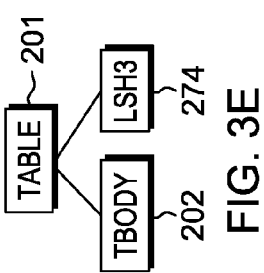

180
CLUSTERING REPETITIVE STRUCTURE OF ASYNCHRONOUS WEB APPLICATION CONTENT

BACKGROUND OF THE INVENTION

The present invention relates generally to the field of web site crawling, and more particularly to improving web crawling efficiency by clustering JavaScript events using common structures of interactive web sites. (Note: the term "JavaScript" may be subject to trademark rights in various jurisdictions throughout the world and are used here only in reference to the products or services properly denominated by the marks to the extent that such trademark rights may exist.)

The use of web application technology, such as the use of asynchronous JavaScript and XML (AJAX) techniques, on client side web application, is changing the web experience from web pages having a unique universal resource locator (URL), to highly dynamic and interactive web pages with a common URL. Technologies such as those included in AJAX techniques allow web applications to send and retrieve data without refreshing the current display. The interactive and dynamic web page behavior poses a great challenge for web crawlers to automatically navigate web pages and web sites that employ such techniques.

Web crawling is the process of browsing a web application in a methodical, automated manner, or in an orderly fashion. Traditional crawling techniques are not sufficient for web applications built using rich Internet application (RIA) technologies. In traditional web application, a page is defined by its URL and all the pages reachable from the current page have their URL embedded in the current page. Crawling a traditional web application requires to extract these embedded URLs and traverse them in an effective sequence. But in RIAs, the current page can change its state dynamically, sometimes without even requiring user input, and hence cannot be mapped to a single URL. All these changes mean that traditional crawlers are unable to efficiently crawl RIAs, except for a few pages that have distinct URLs.

For example, an AJAX web application may contain hundreds of JavaScript events on which a user interacts to navigate into a new state of the site, in which a site state is a presentation of particular content. To explore all possible states, a web crawler needs to execute all JavaScript events in all combinations, which is not feasible for web sites with many web pages interconnected with multiple links. In some cases, combinations of JavaScript events lead to similar webpage states.

Crawling is an important aspect of the existence of the web. An important functionality of the web in general is the information it provides, and the information can only be made available if the different information sources can be found and indexed. If search engines are not able to crawl websites with new information, they will not be able to index them.

SUMMARY

According to one embodiment of the present invention, a method, computer program product, and system for identifying redundant structure of asynchronous web content, is provided. A processor determines whether a document object model (DOM) includes a repetitive pattern of a combination, the combination including a tag of a leaf node and a tag of a parent node of the leaf node. In response to determining the repetitive pattern of the combination, the processor identifies a first inner cluster based on collapsing multiple instances of the repetitive pattern into a single instance of the repetitive pattern. The processor generates a locality sensitive hash (LSH) signature for the first inner cluster based on the single instance of the repetitive pattern. The processor determines an outer cluster, based on grouping one or more inner clusters, including the first inner cluster, as part of a section rooted at a source node of the DOM, in which the source node is a parent node of the one or more inner clusters, and responsive to determining that a pair of outer clusters are near repetitive, the processor limits web content exploration to one of the pair of outer clusters that are near repetitive. The pair of outer clusters are determined to be near repetitive based on comparing the LSH signatures of the source node and a sub-tree of the source node, to the LSH signatures of a distant node of the DOM and a sub-tree of the distant node.

BRIEF DESCRIPTION OF THE DRAWINGS

FIG. 3A illustrates an example diagram of collapsing repetitive patterns of clustering sequences of a DOM fragment, in accordance with an embodiment of the present invention.

FIG. 3B illustrates a locality sensitive hash (LSH) signature determined from the collapsed repetitive patterns of FIG. 3A, in accordance with an embodiment of the present invention.

FIG. 3C illustrates an example diagram of a repetitive pattern of clustering sequences of the DOM fragment of FIG. 3A, in accordance with an embodiment of the present invention.

FIG. 3D depicts an example diagram of collapsing repetitive patterns of clustering sequences of the DOM fragment of FIG. 3A, in accordance with an embodiment of the present invention.

FIG. 3E depicts an example diagram of an LSH signature determined for collapsing repetitive patterns of clustering sequences of the DOM fragment of FIG. 3A, in accordance with an embodiment of the present invention.

DETAILED DESCRIPTION

Figure 1:
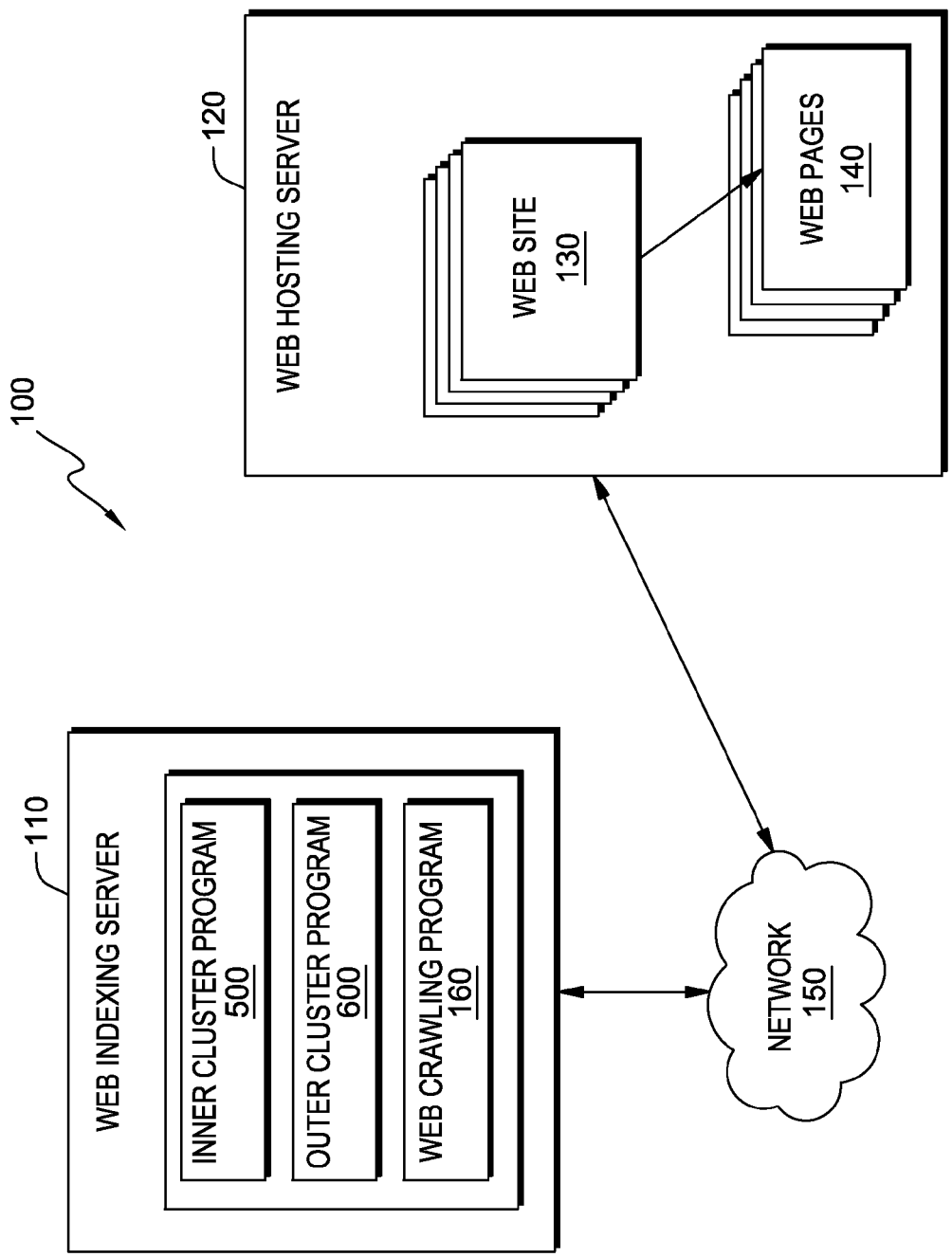
FIG. 1 is a functional block diagram illustrating a distributed data processing environment, in accordance with an embodiment of the present invention.

Embodiments of the present invention identify logically related parts of a webpage and group them. JavaScript events that belong to a group form an event cluster. A web crawler will not discover new webpage states by crawling each possible event within a JavaScript event cluster, therefore, by reducing the web space to be crawled, the performance of the web crawling can be improved dramatically.

Embodiments of the present invention propose a nested clustering technique to group related or similar parts of a webpage. Reference to a cluster refers to a fragment of the document object model of a webpage. The cross-platform and language-independent convention for representing and interacting with objects generated in hypertext markup language (HTML), extended hypertext markup language (XHTML), and extendible markup language (XML), is referred to as a document object model (DOM). The clusters are formed based on underlying pattern that exists in DOM structure. Two types of clusters are generated: inner clusters and outer clusters. First, a set of inner-clusters are formed based on the consecutive structural pattern that is observed at the lower level of a DOM tree (around leaf nodes and their ancestor). The DOM fragment enclosed by an inner cluster contains similar information, therefore event execution order within such a cluster is less likely to discover a new web page state. Next, related inner clusters are grouped as outer clusters which represent a widget or section of a page. The idea of outer clustering is to identify sections of a webpage which represent coherent information. This identification is based on the observation that larger sections or widgets of a webpage have common DOM substructures. The outer cluster formation detects the common substructures that exist within sections. The outer cluster acts as a boundary for inner clusters' JavaScript event execution paths. Execution of an event enclosed by an outer cluster is independent of any event from other outer clusters. While an outer cluster defines the scope of an execution path, an inner cluster includes similar events, and further reduces the number of web pages and links, collectively referred to as the problem space, to be traversed by a web crawler application to find different execution paths. Once both the inner and outer cluster formations are complete, an available state of the art Asynchronous JavaScript and XML (AJAX) exploration algorithm can treat each inner cluster as an individual node, which is bounded by their corresponding outer cluster. This would allow a web-crawler to treat the outer clusters independently and therefore discover new webpage states more quickly.

Embodiments of the present invention recognize the advantages of determining repetition of patterns in source nodes at all levels of a document object model (DOM) without manual inspection or detailed configuration describing the web site. Embodiments of the present invention use techniques to automatically identify near-matching patterns within inner clusters of a DOM, repeated in independent outer clusters of the DOM. The identification of near-matching sections within the DOM indicates similar information contained within the sections, reducing the complexity and reducing the web content of a rich Internet application to be traversed by a web crawler application. Embodiments of the present invention make use of a light-weight algorithm, which can be embedded within a web crawler application, to identify near-matching patterns within subsection of a DOM.

The present invention will now be described in detail with reference to the Figures. FIG. 1 is a functional block diagram illustrating a distributed computer processing environment, generally designated 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed computer processing environment 100 includes web indexing server 110, further depicted as including web crawling program 160, inner cluster program 500, and outer cluster program 600. Distributed computer processing environment 100 also includes web hosting server 120, depicted as including web site 130, and web site 130 including web pages 140. Web indexing server 110 and web hosting server 120 are interconnected via network 150. Network 150 can be, for example, a local area network (LAN), a telecommunications network, a wide area network (WAN), such as the Internet, a virtual local area network (VLAN), or any combination that can include wired, wireless, or fiber optic connections. In general, network 150 can be any combination of connections and protocols that will support communications between web crawling program 160, inner cluster program 500, outer cluster program 600, and web indexing server 110, and web site 130, web pages 140 and web hosting server 120, in accordance with embodiments of the present invention.

Web hosting server 120 hosts multiple web sites, including web site 130. Web hosting server 120 may be a desk top computing device, a rack mounted computing device, a blade server, a management server, a mobile computing device, or any other electronic device or computing system capable of performing program instructions, and receiving and sending data. In other embodiments, web hosting server 120 may represent a computing system utilizing multiple computers as a server system, such as in a cloud computing environment. In yet another embodiment, web hosting server 120 may be a laptop computer, a tablet computer, a netbook computer, a personal computer (PC), a desktop computer, a personal digital assistant (PDA), a smart phone, or any programmable electronic device capable of communicating with web indexing server 110, via network 150, and hosting web site 130. In another embodiment, web hosting sever 120 can be a computing system utilizing clustered computers and components (e.g., database server computer, application server computers, etc.) that act as a single pool of seamless resources when accessed within distributed information exchange environment 100. Web hosting server 120 may include internal and external hardware components, as depicted and described with reference to FIG. 7.

Web site 130 includes a collection of connected web content depicted as web pages 140. Web site 130 is accessed by a computing device connecting to a web page of web pages 140; often the connection is made to a home page of the web site, and the web site may be structured in a hierarchical format, referred to as a tree structure. The structure of web site 130 may be represented as a graphical tree structure that starts at the home page as a root node of the web site, and hierarchically descends by level to terminating web pages, often referred to as leaves of the tree structure. Intermediary pages between the root and the leaves of the structure are referred to as nodes. The DOM standard allows programs and scripts to dynamically access and update the content, structure, and style of a web document, such as web pages 140.

Web pages 140 are the web pages of web site 130 and display content to users accessing a page of web pages 140 via a web browser. Web pages 140 include programming instructions and content, which makes use of rich Internet application technologies (RIA). RIA enables content of a web page to dynamically change with or without user intervention, and without a change to the URL address associated with a web page of web site 130. Web pages 140 may include program instructions, content, links interconnecting web pages, and formatting instructions to present the content to a user in a browser application. Web site 130 is one of multiple web sites hosted on web hosting server 120. The programming instructions and content of web pages 140 make use of rich Internet application technologies, in which content may dynamically change with or without user intervention, without change to the universal resource location (URL) address associated with a web page of web site 130.

Web indexing server 110 is a server computing device that includes web crawling program 160, inner cluster program 500, and outer cluster program 600. Web indexing server 110, operating web crawling program 160, explores web sites, such as web site 130, via network 150. Web indexing server, to determine the content of web pages, such as web pages 140, and index the content of web pages in support of network-based searches, such as using a search engine on the Internet.

Web crawling program 160 is an application that browses web site applications and web page content in a methodical, automated manner. A web crawler is an internet bot, which is a software application that runs automated tasks over the Internet, and systematically browses the World Wide Web, typically to index the content and facilitate searches. If web crawling program 160 is not able to crawl a web site with web pages containing new information, and index the information, search engines associated with web crawling program 160 will not be able to locate the new web-based information in searches. The crawl process begins with web addresses from past crawls and sitemaps provided by web site owners. Web crawling program 160 visits websites and looks for links to other pages to visit and focuses on new sites, new pages, changes to existing sites, and inactive links.

Inner cluster program 500 analyzes the hierarchical content of a web site, such as web site 130, and uses a nested clustering technique to group relevant parts of a webpage. A cluster refers to a fragment of the DOM of a web page. The clusters are formed based on the consecutive structural pattern that is observed at the lower level of the DOM tree; at the leaf nodes and their ancestors. DOM fragments containing similar information form an inner cluster. Related inner clusters are grouped by outer cluster program 600 as an outer cluster, which represents a section of a web page. The concept of an outer cluster is to identify sections of a web page which represent coherent, related information. The outer cluster acts as a boundary for inner cluster event execution paths. An event is executed code, associated with a web page or web site, performing a task related to the web page, the web page contents, or an interaction of a user with the web page. For example, JavaScript code that is executed as a user rolls a mouse pointer over a section of a web page, is an event. Execution of an event enclosed by an outer cluster is independent of any event from another outer cluster. Inner clusters group similar events and therefore aid web crawling to find different execution paths. The following discussion with regard to FIGS. 2A, 2B, 3A, 3B, 3C, 3D, and 3E, describes techniques used to identify inner clusters within a DOM structure.

Figure 2A:
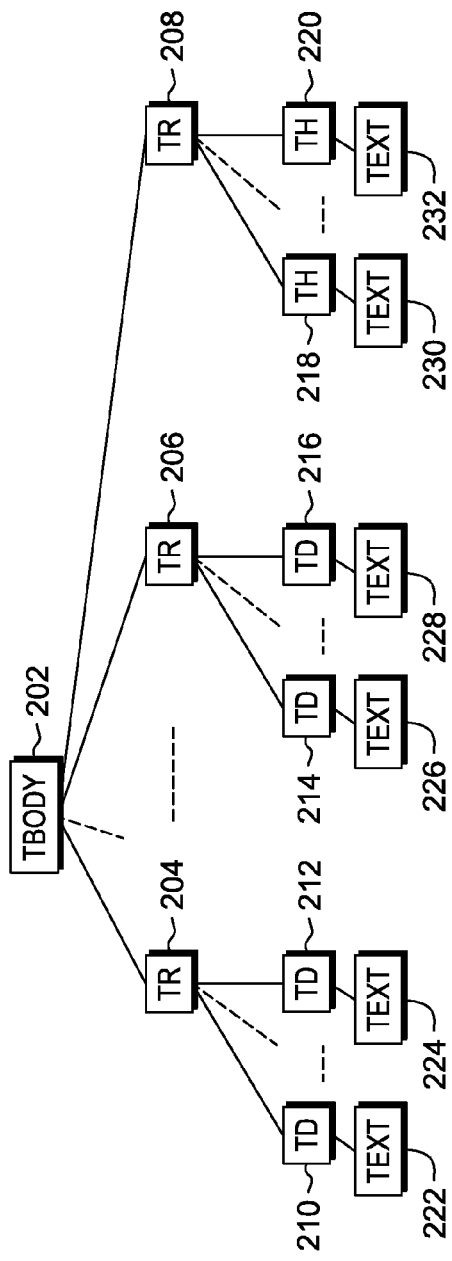
FIG. 2A illustrates an example diagram fragment of a document object model (DOM), in accordance with an embodiment of the present invention.

FIG. 2A illustrates an example diagram fragment of a document object model (DOM), in accordance with an embodiment of the present invention. The DOM fragment may be part of a webpage, for example a table, and depicts the hierarchical (tree) structure of the fragment. In embodiments of the present invention, the DOM structure is simplified by keeping an identifying name of each DOM node, preserving the hierarchy, but removing some DOM nodes that are not required for determining clustering patterns, which may create unnecessary noise in detecting patterns, for example nodes only providing attributes. The resulting DOM may be referred to as a stripped DOM tree.

In the example embodiments presented herein, the DOM tree includes HTML tags that include <tbody>, which groups the body content in an HTML table, <tr>, which defines a row in an HTML table, <td>, which defines a standard cell in an HTML table, and <th>, which defines a header cell in an HTML table. The DOM fragment is a stripped DOM tree with tbody 202 as a source node, which is a parent node to elements tr 204, tr 206, and tr 208. It is assumed that there may be additional "tr", "td", and "th" elements at various levels of the DOM structure, as implied by the dashed lines, for example, between tr 204 and tr 206; however, for clarity purposes, the discussion will focus on the depicted nodes of FIG. 2. Tr 204 is a parent node to td 210 and td 212, which are parent nodes to text 222 and text 224, respectively. Similarly, tr 206 is a parent node to td 214 and td 216, which are parent nodes to text 226 and text 228, respectively. Tr 208 is a parent node to th 218 and th 220, which are parent nodes to text 230 and text 232, respectively.

Figure 2B:
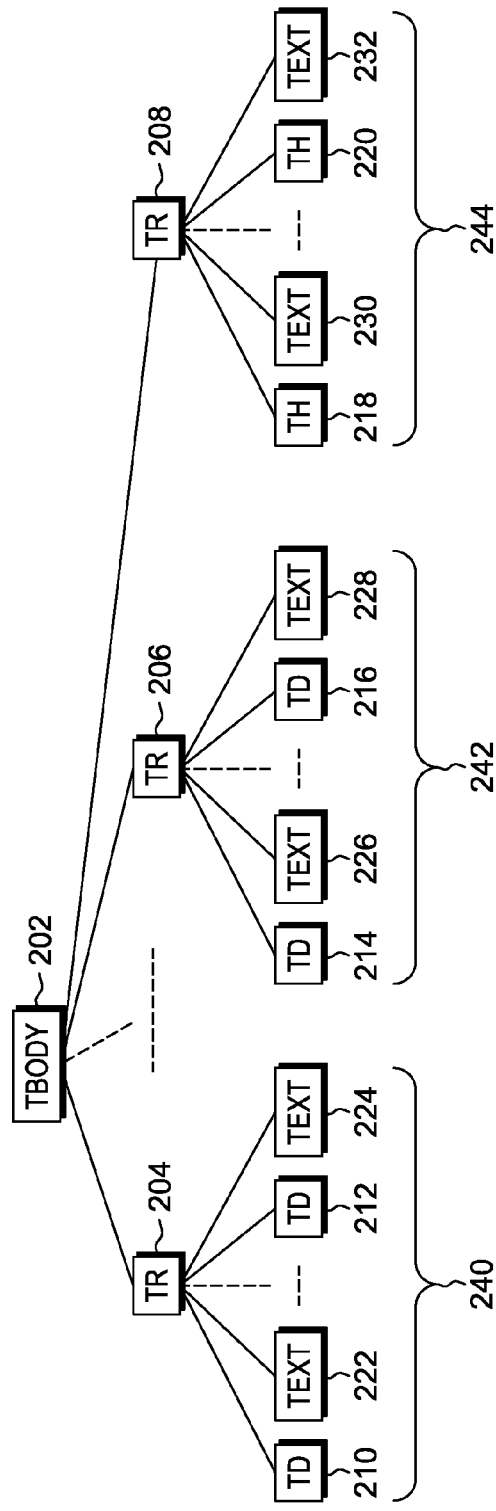
FIG. 2B illustrates an example diagram of a clustering sequence of a DOM fragment, in accordance with an embodiment of the present invention.

FIG. 2B illustrates an example diagram of a clustering sequence of a DOM fragment, in accordance with an embodiment of the present invention. In an embodiment of the present invention, the detection of structural patterns of leaf nodes in the stripped DOM, forms a cluster. Structural patterns of <td> <text> are detected in parent nodes tr 204 and tr 206, while tr 208 forms a cluster from the detected pattern of <th> <text>. Tr 204, tr 206, and tr 208 are shown as children of node tbody 202; however, in this step, the leaf nodes of the DOM fragment structure are pushed up to the next higher level and associated with their respective parent nodes. For example, the node text 222 is pushed up to its parent level and associated with parent node td 210. Pattern 240 includes td 210 and text 222, and td 212 and text 224. Similarly, pattern 242 includes td 214 and text 226, and td 216 and text 228. Pattern 244 includes leaf nodes text 230 and text 232, which are pushed up and associated with their parent nodes, th 218 and th 220, respectively.

By pushing up the nodes of the lower level and associating them with their parent nodes, repetitive patterns can be detected. For the example in FIG. 2B, the two distinct consecutive patterns, <td> <text>, and <th> <text>, are detected. Because the cluster formed from node tr 204 and node tr 206 are the same pattern, they are considered the same cluster, which may be referred to as C1, and includes pattern 240 and pattern 242. This technique is used repetitively at each level of the DOM in which repetitive patterns are detected, to determine inner clusters and outer clusters.

FIG. 3A illustrates an example diagram of collapsing repetitive patterns of clustering sequences of a DOM fragment, in accordance with an embodiment of the present invention. The repetitive patterns detected are collapsed into a single instance of the pattern. For example, the repetitive pattern of <td> <text> for the node tr 204, which includes td 210 and text 222, and td 212 and text 224, and assumed potentially other instances of this pattern (FIG. 2B), are collapsed into a single instance of the pattern as depicted by nodes td 250 and text 260. The repetitive pattern, among the children nodes of node tr 206, is collapsed into a single instance of td 252 and text 262, and the repetitive pattern found in the children nodes of node tr 208 is collapsed into a single instance of th 254 and text 264. The collapsing of repetitive patterns forms an inner cluster, and traversing levels of the DOM hierarchy may result in nested inner clusters.

FIG. 3B illustrates a locality sensitive hash (LSH) signature determined from the collapsed repetitive patterns, in accordance with an embodiment of the present invention. For each single instance of collapsed repetitive patterns a locality sensitive hash (LSH) signature is calculated. Generating an LSH signature for each pushed-up, collapsed node pair, provides a signature corresponding to the underlying pattern of sub-tree. FIG. 3B shows the signature generation of LSH1 for the pairing of td 250 and text 260, and the pairing of nodes td 252 and text 262 will have the same signature, LSH1, (not shown). The signature generation for the pairing of th 254 and text 264 produces LSH2.

An LSH differs from hash functions used in cryptography. An LSH signature is a technique to create a similar hash, which is used to determine similarity rather than a 100% match. To form the inner clusters, an LSH signature of DOM sub-trees are generated in a bottom-up manner. An LSH signature is generated at each DOM node except for the leaf child node of the DOM. An LSH key associated with a DOM node represents an underlying structure of the sub-tree rooted at that node. The LSH signature generation results in a virtual DOM tree of LSH values. At each level of the DOM, a check is made to determine the largest consecutive DOM nodes. If such a pattern exists, the underlying sub-tree of the pattern is marked as an inner cluster and the repeated occurrences of the pattern are collapsed. The LSH signature is also used in outer cluster detection.

By use of a similar hash, similar patterns can be detected, and similar patterns detected in different sections of the DOM indicate similar information. Therefore, the order of executing events within the clusters of the different sections is unlikely to discover new web page states. By identifying the clusters of similar patterns, web crawling combinations and coverage area of the web page can be reduced.

Known methods of generating an LSH key of length n, for each pair of collapsed, repetitive parent-child nodes, for example td 250 and text 260, include selection of n Gaussian random numbers, reusing the same value for another instance of the same pair combination. The vector of Gaussian numbers are added, and if the summed value is greater than zero, the value 1 is assigned, otherwise the value 0 is assigned. This creates a signature of the pattern, and if a very similar pattern is detected in another section of the DOM, the LSH signature of the pattern in the other section of the DOM will be very similar. Hamming distance techniques can be used to determine the degree of difference in similarity between detected patterns of different sections within the DOM.

FIG. 3C illustrates an example diagram of a repetitive pattern of clustering sequences of a DOM, in accordance with an embodiment of the present invention. The generated LSH signature values are pushed up the DOM tree structure to the parent nodes. For example, LSH1 270, which is generated from td 250 and text 260, is pushed up to node tr 204, forming the pair tr 204, LSH1 270. LSH1 270 is also paired with tr 206, since repetitive pairs reuse the same LSH signature value. Tr 208 is paired with LSH2 272, which is generated from th 254 and text 264. At this level of the DOM structure there is another repetitive pattern of <tr> <LSH1>, detected, from tr 204, LSH1 270, and tr 206, LSH1 270. A cluster, which can be referred to as C2, is formed based on the detected repetitive pattern, and the consecutive paths are collapsed to a single instance. It should be noted that the inner cluster formed at this level of the DOM (C2) includes a previously determined inner cluster from a lower level of the DOM (C1).

FIG. 3D depicts an example diagram of collapsing repetitive patterns of clustering sequences of a DOM fragment, in accordance with an embodiment of the present invention. The repetitive pattern of <tr> <LSH1> is collapsed into a single instance as shown by tr 205 and LSH1 270. At the current level of the DOM fragment, the node elements include tr 205 and LSH1 270, and tr 208 and LSH2 272. There are no additional repetitive patterns identified under the sub-tree of node tbody 202.

FIG. 3E depicts an example diagram of an LSH signature determined for collapsing repetitive patterns of clustering sequences of a DOM fragment, in accordance with an embodiment of the present invention. The LSH signature for tr 205, LSH1 270 and tr 208, LSH2 272 is generated, producing the signature LSH3—274. The leaf nodes are pushed up to the parent level, moving node LSH3 274 to the parent level of tbody 202, which is shown with its parent node table 201, which is a root node of the table of the DOM fragment (not previously shown). There are no unique repetitive patterns detected at the level of tbody 202 and there are no clusters to form. Embodiments of the present invention continue in this manner of detecting repetitive patterns of structure, forming clusters, collapsing consecutive instances of patterns into a single instance, generating LSH signatures, and pushing the leaf nodes (LSH signatures) up to the parent level, until the root node is reached. Reaching the root node of the DOM results in identification of all inner clusters of the DOM, and LSH signatures generated for the nodes of sub-trees within the DOM. Having generated LSH signatures and identified inner clusters, determination of outer clusters proceeds.

Outer cluster identification is accomplished by detecting near-repetitive patterns of DOM structure at higher levels, or sections of the DOM. Two near-repetitive HTML DOM substructures occurs when there is a complete match (100%) or nearly a match (greater than a pre-determined threshold, for example 99% match), of the structures.

Figure 4:
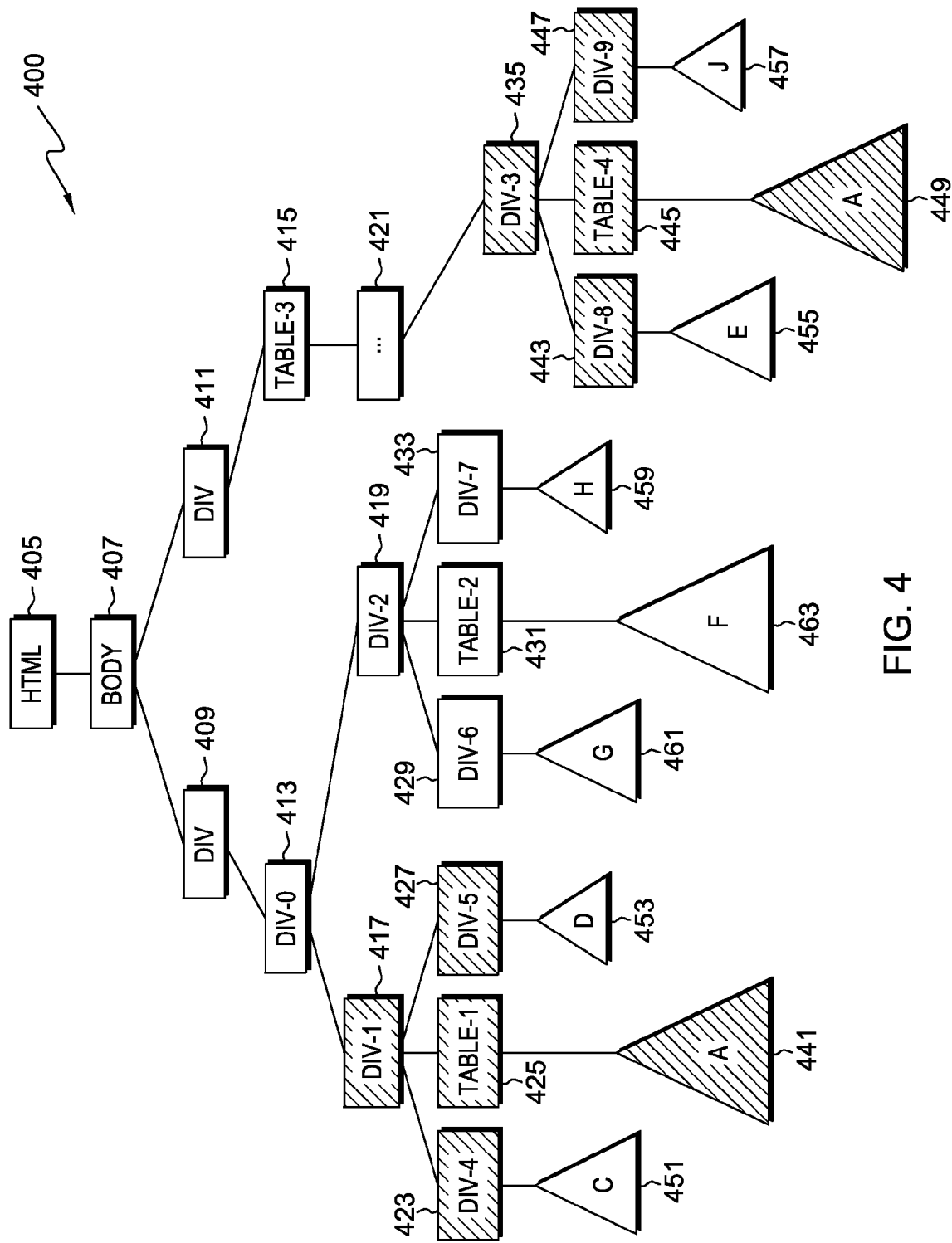
FIG. 4 depicts an example diagram of a repetitive pattern of clustering sequences at a distant node in a hierarchical DOM structure fragment, in accordance with an embodiment of the present invention.

FIG. 4 depicts an example diagram of a repetitive pattern of clustering sequences at a distant node in hierarchical DOM structure fragment 400, in accordance with an embodiment of the present invention. The discussion of identifying a match or near-match of repetitive patterns of clustering sequences between a source node and a distant node is performed by outer cluster program 600. The identification of an outer cluster in a section of a DOM is based on detecting near-repetitive patterns of structure at higher levels of the DOM. Two HTML DOM sub tree structures are determined to be near-repetitive when there is a complete match or almost a complete match of the sub tree structures. The designation of "almost a complete match" is based on a user determined level of match in which a comparison of the two sub tree structures differs by a designated degree. In various embodiments of the present invention, the near-match or "almost a complete match" may be specified in percentage of matching structure elements (e.g. 90%), a probability level of matching structure elements (e.g. 0.95 probability), a range of matching structure elements, (e.g. 8 out of 10 elements), or less than a specified hamming distance between the two LSH signature values (e.g. 2 bit positions differing out of a 10 bit signature).

Related inner clusters are grouped as outer clusters, which represent a section of a web page. Sections of a web page include information that is interrelated or relevant; however, different sections of a web page may share common DOM structures, or common inner clusters. Determination of an outer cluster detects the common substructures that exist among different sections of a DOM and acts as a boundary for inner cluster event execution paths. Execution of an event enclosed by an outer cluster is independent of any event from other outer clusters, and crawling the event in both outer clusters will likely discover new web page states. Therefore, within an outer cluster, inner clusters with near-matching structure may be redundant and crawling of the repetitive structures is avoided to reduce the amount of crawling of the web page/web site. However, inner clusters of different outer clusters, may have near matching structure, but include different information, and executed events within the inner clusters of the different outer clusters will be crawled as they are likely to produce new web page states.

The example HTML structure begins at root node HTML 405, which has child node body 407, which in turn has two children nodes, div 409 and div 411. Nodes div 409 and div 411 each have one child node, div-0 413, and table-3 415, respectively. Node div-0 413 is shown to have two child nodes, div-1 417 and div-2 419, and node table-3 415 is shown to have one or more child nodes as designated by the node tag < . . . > 421. Each triangle shape in FIG. 4 represents the sub-tree of a DOM node within the hierarchical structure of the DOM. The size of the triangle represents the relative size of the HTML sub-tree, and the label of a triangle uniquely identifies the sub-tree, for example, sub-tree C 451 is unique to sub-tree A 441. Patterns are determined and searched for at distant nodes in other sections of the DOM. A distant node of a source node, for example node "S", is outside of an inner cluster, and is not a member node of the sub-tree rooted at the parent node of the source node, in this example, node "S". Therefore a distant node is not a sibling of the source node, and is not within the sub-tree of the source node, nor within the sub-tree of any sibling of the source node.

A DOM source node for an outer cluster is outside of an inner cluster and is checked to determine if the sub-tree from the source node forms an outer cluster. Initially, a non-visited node is selected for outer cluster determination and is marked as visited. The source node sub-tree is checked for a pattern that is used to search the other sections of the DOM for repetition. The pattern for a source node "S" is determined by: including the node S, including the child nodes of S, and including a sub-tree rooted from one of the child nodes of S. Nodes div 409 and div 411 are siblings, so cannot be considered for a source node and a distant node. Nodes div-0 413 and table-3 415 do not share a similar pattern at their child nodes, and consideration for determining a pattern that may be repetitive moves to the next hierarchical level of the DOM to node div-1 417.

Node div-1 417 has child nodes div-4 423, table-1 425, and div-5 427, each having a sub-tree structure, therefore there are three patterns that can be searched for in distant nodes. One pattern includes source node div-1 417, child nodes div-4 423, table-1 425, and div-5 427, and C 451, which is a sub-tree of node div-4 423. The second pattern includes source node div-1 417, child nodes div-4 423, table-1 425, and div-5 427, and A 441, which is a sub-tree of node table-1 425. The third pattern includes source node div-1 417, child nodes div-4 423, table-1 425, and div-5 427, and D 453, which is a sub-tree of node div-5 427.

Node div-2 419 is a sibling of div-1 417, and cannot be considered a distant source node to search for a repetitive pattern; however, any node in the sub-tree rooted at node table-3 415 can be a possible distant node for source node div-1 417. Node div-3 435 is a child of the one or more child nodes of node table-3 415 and can be considered as a distant node and compared to node div-1 417. Node div-3 435 has child nodes div-8 443, with sub-tree E 455, table-4 445, with sub-tree A 449, and div-9 447 with sub-tree J 457.

To search for a repetitive pattern of the source node, existing in a distant node, an LSH signature is generated for each pattern as described above in the discussion of inner clusters. The LSH signature for each node in each level of the DOM hierarchy is retained and accessible for use in comparison of structure patterns between a source node and a distant node, to determine outer clusters. An exact match of LSH signatures, or a small hamming distance of LSH signatures of patterns between the source node and a distant node, indicates that the patterns are the same or very similar. For example, node div-1 417 is selected as a node to generate a pattern and determine if the pattern is repetitive in a distant node of the DOM fragment. The pattern of source node div-1 417, child nodes div-4 423, table-1 425, and div-5 427, with sub-tree A 441 (pattern: div, table+sub-tree A, div) produce a match or near-match with the pattern found in non-visited distant node div-3 435, with child nodes div-8 443, table-4 445, div-9 447, with sub-tree A 449. The LSH signatures generated for each node during inner cluster determination, and the LSH signature representing the sub-trees for the source node and the distant node, are compared to determine the match or near-match. As an example embodiment of the present invention, the shaded areas of FIG. 4 depict matching or near-matching of the sub-tree rooted at node div-1 417 and the sub-tree rooted at node div-3 435. The areas rooted at node div-2, including div-6, parent to G-461, table-2 431, parent to F 463, and div-7 433, parent to H 459, are not a match to the other depicted sub-trees.

Finding a match or near-match of a repetitive pattern of a source node at a distant node results in the formation of two outer clusters, one includes all events within the sub-tree rooted at the source node, and the other includes all events within the sub-tree rooted at the distant node. The identified outer clusters are added to a cluster listing and stored. The process continues with the selection of non-visited nodes as a source node, and searching for repetitive patterns of the next non-visited source node in distant nodes. When all nodes are marked as visited, the process ends and the identified outer clusters are output to a receiving source, such as a web crawling application that can apply the outer cluster information.

Figure 5:
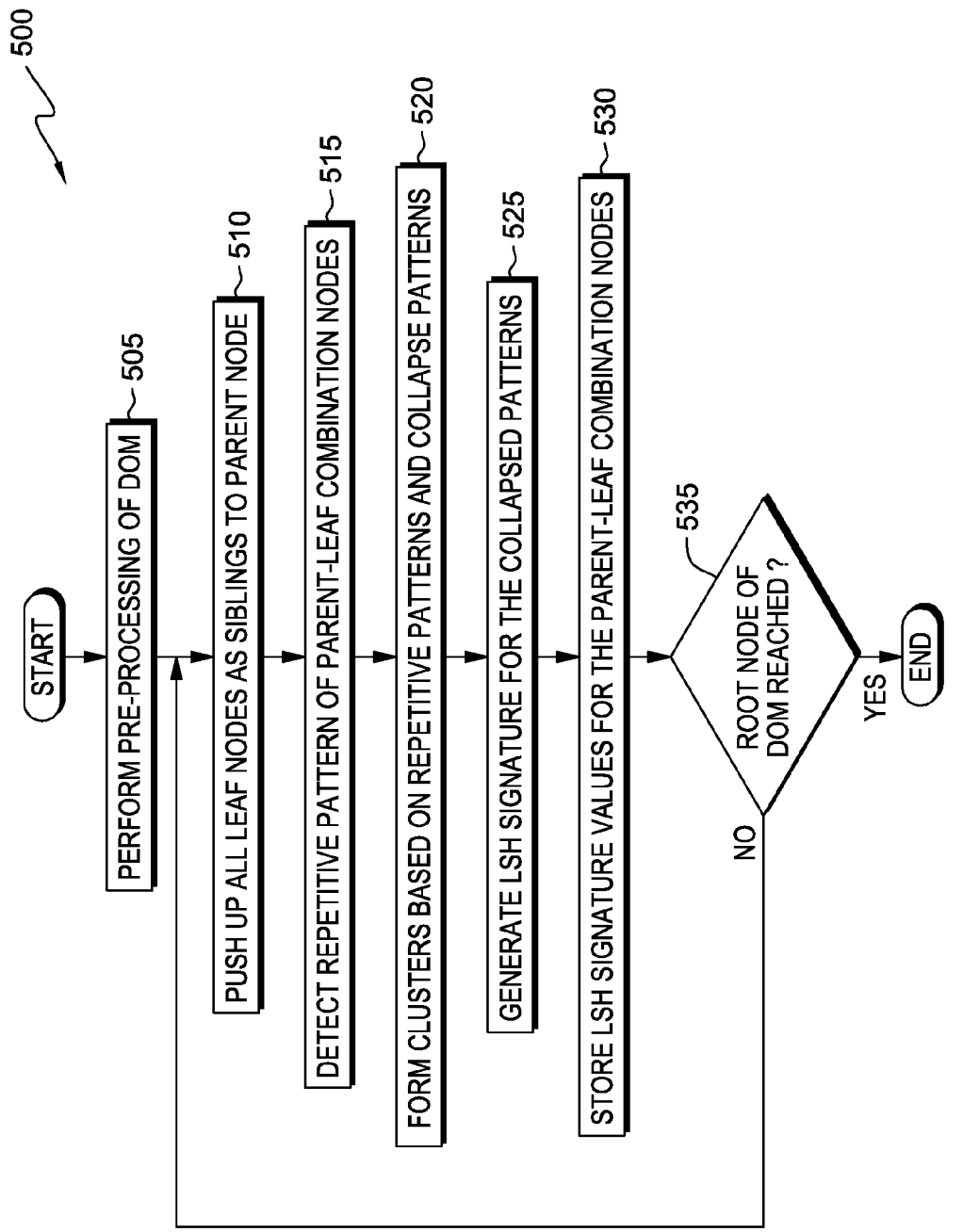
FIG. 5 depicts operational steps of an inner cluster program, inserted on a web indexing server computer within the data processing environment of FIG. 1, in accordance with an embodiment of the present invention.

FIG. 5 is a flowchart of inner cluster program 500, operating on web indexing server 110 within the distributed computer processing environment of FIG. 1, in accordance with an embodiment of the present invention. Inner cluster program 500 performs a pre-processing operation on the DOM tree (step 505). The DOM tree is simplified by retaining the name of each DOM node while preserving the hierarchical structure. Some DOM nodes include text content and attributes, and are removed to avoid noise issues in pattern detection within the DOM. The result is a stripped DOM, with hierarchical and node name integrity.

Inner cluster program 500 pushes up all leaf nodes as siblings to their parent nodes (step 510). The leaf nodes of a DOM represent content of a web page, therefore contiguous structural patterns found in leaf nodes indicate the information in the node structure is connected and possibly related. Inner cluster program 500 works in a bottom-up manner and creates a virtual DOM node that combines the leaf node and the parent of the leaf node, such that the leaf node and its parent are as siblings, but combine to form a single node. For example, leaf nodes text 222 and text 224 (FIG. 2A), are pushed up as siblings to their parent nodes td 210 and td 212, respectively, and the combinations of parent and leaf nodes, as new virtual nodes, form pattern 240 (FIG. 2B).

Inner cluster program 500 analyzes the combination nodes within the level of the DOM hierarchy and detects repetitive patterns of parent-leaf combination nodes (step 515). Inner cluster program 500 traverses the hierarchy level of the DOM to detect repetitive patterns, which are indications of static parts of the web page, which are unlikely to produce new web states, and offer little to include in web crawling. Inner cluster program 500 detects patterns with similar tag combinations, for example <td> <text>, <td> <text>, <td> <text> . . . , which are similarly depicted in FIG. 2B.

Inner cluster program 500 forms clusters based on the repetitive patterns and collapse patterns (step 520). Repetitive patterns detected within the DOM hierarchy level that includes the combination of leaf-parent nodes, form clusters, depicting a repetition of the combination element tags formed by pushing up leaf nodes to their parent node level. Similar repetitive patterns may be rooted at different nodes. For example, the combination sequence of td 210, text 222 . . . td 212, text 224, which is rooted at node tr 204 forms pattern 240. The combination td 214, text 226 . . . td 216, text 228, which is rooted at tr 206, forms pattern 242 which is a consecutive repetitive pattern of pattern 240 (<td> <text> . . . ). The repetitive instances of the pattern are collapsed into a single instance by inner cluster program 500. Pattern 240 is collapsed into a single instance of <td> <text>, and the consecutive repetitive pattern rooted at node tr 206 of <td> <text>, because it is the same repetitive pattern, is also collapsed into the single instance of the pattern.

For example, rooted at tr 204 is the repetitive pattern of <td> <text>, depicted in FIG. 2B as pattern 240 which includes td 210, text 222; . . . ; td 212, text 224. Similarly, pattern 242 includes the same <td> <text> pattern. Inner cluster program 500 collapses pattern 240 and pattern 242 into a single instance of the pattern, as depicted by td 250, text 260 (FIG. 3B). The repetitive pattern <th> <text> . . . <th> <text>, is collapsed into a single instance of th 254, text 264, rooted at node tr 208.

The single instances of patterns are used by inner cluster program 500 to generate LSH signatures for the collapsed patterns (step 525). A locality sensitive hash signature is generated for each single instance of pattern. The LSH signature is generated from the tag or label node of the leaf node, combined with the leaf node which is pushed up to the level of its parent tag node, for example, <td> <text>. Feature vectors of the portion of the DOM considered in generating the LSH signature are used to represent the DOM portion in a high dimensional space. Three types of features are considered in generating the LSH signature of the collapsed pattern. One type of feature is the tags or labels included in the signature, for example <td> <text>, <th> <text>, etc. Another feature type represents a position of a respective tag—label combination in a sequence. This is represented as "<tag>-<label>-position-number. This feature type encodes order information of the tag-label combinations in a sequence. Another type of feature is an integer value that includes structural information of the sub-tree rooted at a particular node, after LSH signature generation, used to generate subsequent LSH signatures.

Inner cluster program 500 generates an f-bit signature from the ordered tags represented in a feature space. A pool m of pre-computed Gaussian-distributed random values N (0, 1) is maintained, and each feature is hashed into a random value. To create a d-bit signature of a given sequence of tag-labels, inner cluster program 500 applies d-hash functions (for example, h1, h2 . . . hd, hash functions), and a hash function is applied to a corresponding feature. A hash function maps a specific feature into one of d-random values from the pool m. The fixed mapping enables association of the same feature hash into specific random values from random values N (0, 1). Each element of a resulting vector contains a partial dot product of the feature vector of the sequence with a random unit vector. When the same feature is observed in a sequence, each component of a resulting vector is incremented by random values associated with that feature accessed by the hash functions h1 to hd.

To create a signature of length d, a floating point vector D of the same length is maintained and each element is initialized. For a sequence of two tags or tag-label, a feature space is created, and each feature is represented as a unit vector of d elements, which maps d random values drawn from N(0, 1) accessed through hash functions h1 to hd, producing h1f1 through hdf1 for a first feature, f1.

Each component of resulting vector D is incremented by the random value of the unit vector representative of each respective feature. When all features or unit vectors are processed, a sign of the resulting vector D produces a signature of the tag/label sequence. For example, when a value in resulting vector D is zero or less, a value of zero is placed in a corresponding level entry of resulting vector D, and when a value in resulting vector D is greater than zero, a value of one is placed in a corresponding level entry in resulting vector D.

Having generated LSH signatures, inner cluster program 500 stores the LSH signature values for the parent-leaf combination nodes (step 530). The LSH signature of a node represents the underlying sub-tree structure of that node and is used to determine matching or near matching structures within fragments of the DOM. In one embodiment of the present invention, the LSH signature values are stored in a physical memory component of web indexing server 110, further discussed with respect to FIG. 7.

Having determined the LSH signatures of the combination nodes for a hierarchy level of the DOM, inner cluster program 500 determines if the root node has been reached (decision step 535). Inner cluster program 500 generates LSH signature values from the bottom of the DOM tree structure, beginning at the leaf nodes which are pushed up a level to their respective parent nodes, at each level of the DOM tree structure, until the root node of the DOM is reached. Determining that the root node of the DOM has not been reached, (step 535, "NO" branch), inner cluster program 500 pushes up all leaf nodes as siblings to their respective parent nodes (step 510), and proceeds as discussed above.

The LSH signature values, generated from the combination tags, tag-label nodes, become the leaf nodes of the DOM and are pushed up to their parent nodes to form a new combination node of the parent tag and the LSH value. For example, the collapsed sequence of <td> <text>, rooted at node tr 204 generates LSH 1 (FIG. 3A, 3B), and the collapsed sequence of <th> <text> rooted at node tr 208 generates LSH2. LSH1 and LSH2 become leaf nodes in the DOM structure, and pushed up as siblings to their parent nodes tr 205 and tr 208, rooted at tbody 202, (tr 205 is the result of collapsed tags tr 204, through tr 206). The LSH signatures (LSH1 270, LSH2 272) that are pushed up to the next node level, become features used to generate the new LSH signature values at the next hierarchical level of the DOM. Inner cluster program 500 continues the process at each subsequent level of the DOM until the root node of the DOM is reached.

Determining that the root node of the DOM is reached (step 535, "YES" branch), and having stored the LSH signature values for the nodes of the DOM, inner cluster program 500 ends.

Figure 6:
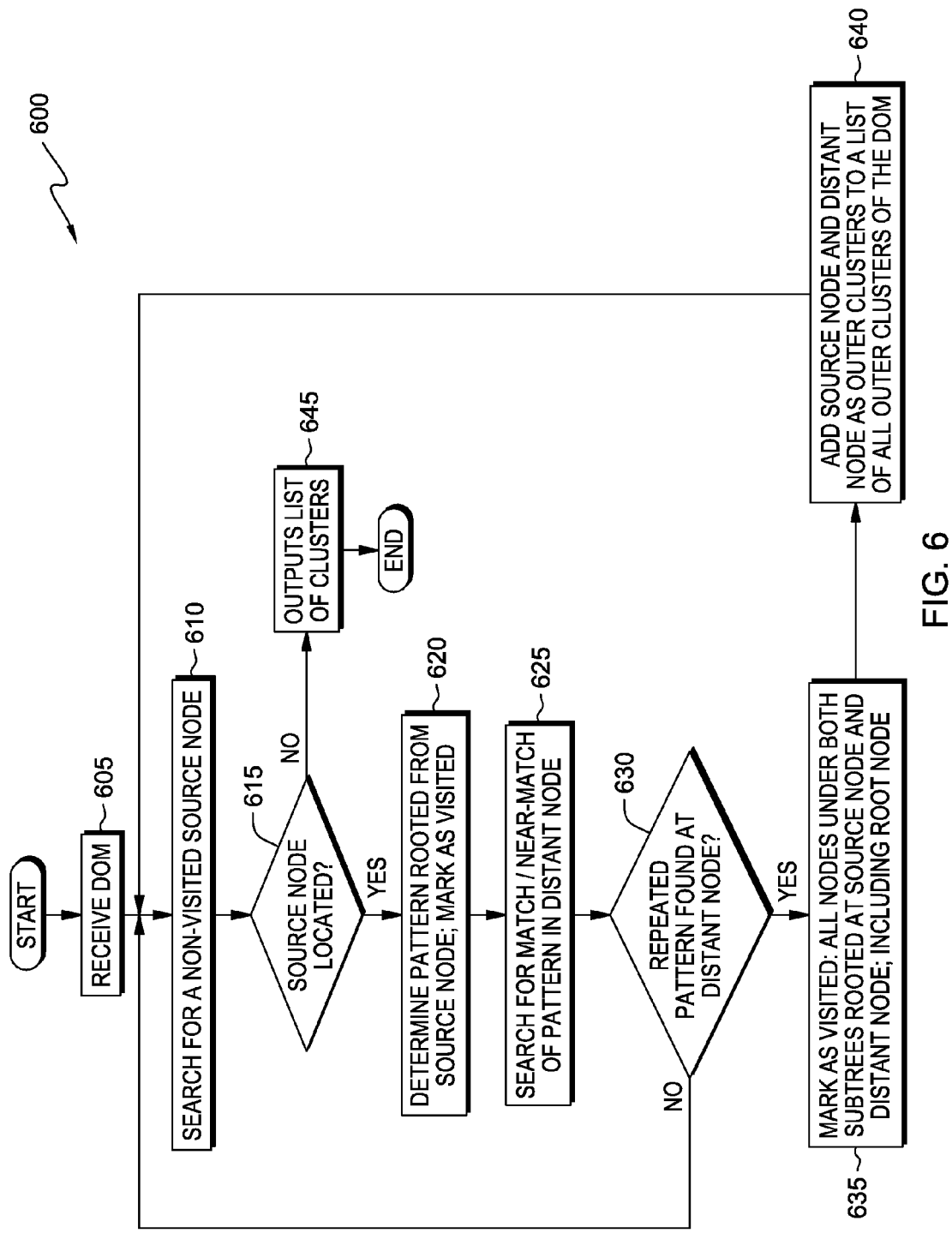
FIG. 6 depicts operational steps of an outer cluster program, inserted on a web indexing server computer within the data processing environment of FIG. 1, in accordance with an embodiment of the present invention.

FIG. 6 depicts operational steps of outer cluster program 600, inserted on web indexing server 110 within the data processing environment of FIG. 1, in accordance with an embodiment of the present invention. Outer cluster program 600 forms outer clusters by grouping inner clusters into a section rooted at a source node of the DOM, and identifies matching or near-matching sections at a distant node of the DOM. Outer cluster program 600 produces a listing of outer clusters of the DOM, and each outer cluster includes inner clusters of related structure. Embodiments of the present invention are equally applicable to a full DOM structure and a fragment of a full DOM structure, and references made to a/the DOM or a/the DOM fragment are not limiting.

Outer cluster program 600 receives the DOM structure (step 605). Outer cluster program 600 receives the DOM structure resulting from the inner cluster formation performed by inner cluster program 500, which includes LSH signature values for each non-leaf node in the DOM. In one embodiment of the present invention, outer cluster program 600 receives the DOM structure for an entire web page. In another embodiment, the DOM structure of a web page is received. The DOM structure may be represented graphically as a tree structure and includes a hierarchical structure with the root node as the highest level node of the tree structure, and leaf nodes at the terminal ends of the tree structure.

Outer cluster program 600 searches for a non-visited source node (step 610). Outer cluster program 600 works in a top-down manner in a DOM tree structure. In one embodiment of the present invention, outer cluster program 600 operates by traversing a DOM tree structure of a web page beginning at the root node of the web page. In another embodiment, outer cluster program 600 operates by traversing a fragment of a DOM tree structure of a web page, beginning at the root node of the DOM fragment. In yet another embodiment, outer cluster program 600 operates by traversing a full web page, beginning at the root node of the web page. For purposes of clarity and convenience, subsequent reference to a/the DOM fragment or a/the fragment of the DOM, equally apply to a/the DOM. Outer cluster program 600 selects a node of a DOM fragment that has not been visited. In one embodiment of the present invention, none of the nodes of the DOM fragment have been visited by outer cluster program 600, and the root node of the DOM fragment is selected. As a node is selected and checked to determine if the sub-tree rooted from the node forms an outer cluster, it is marked as visited. To be a source node, the selected node must be outside of an inner cluster.

Outer cluster program 600 determines if a non-visited node, located outside an inner cluster, has been located (decision step 615). Initially there are no nodes marked as visited and outer cluster program 600, working in a tops-down manner, selects the root node of the DOM fragment, and subsequently selects a non-visited node at the highest hierarchical level of the DOM fragment.

Determining that a source node has been located (step 615, "YES" branch), outer cluster program 600 determines the patterns of the sub-tree rooted from the source node and marks the source node as visited (step 620). Outer cluster program 600 reuses the LSH signature values generated during inner cluster formation to create a LSH key for each pattern found within the sub-tree structure rooted at the source node. Patterns are generated for structures that include the source node, the child nodes of the source node, a sub-tree rooted from one of the child nodes of the source node.

For example, considering div-1 417 (FIG. 4), as a source node, there are three patterns that are generated. The first pattern generation includes div-1 417, and child nodes div-4 423, table-1 425, div-5 427, and sub-tree C 451 rooted at node div-4 423. The second pattern includes the same source node and child nodes, and sub-tree A 441, rooted at table-1 425. The third pattern includes the source node div-1 417, the child nodes div-4 423, table-1 425, and div-5 427, and sub-tree D 453, rooted at div-5 427.

Outer cluster program 600 searches the DOM fragment for a match or near-match of the patterns determined for the source node (step 625). The LSH signature values generated during inner cluster formation are reused to form an LSH key representing the nodes of the pattern found in the sub-tree of the source node. Outer cluster program 600 searches the DOM fragment for matches or near-matches to the patterns of the LSH signature values of the source node. For example, node div-1 417 (FIG. 4), is a source node and a pattern is generated for the node structure that includes nodes div-1 417, child nodes div-4 423, table-1 425, div-5 427, and sub-tree A 441 rooted at node table-1 425. The LSH signatures generated during inner cluster formation, via inner cluster program 500, are used to create an LSH key that represents the structure of the pattern. Outer cluster program 600 searches the DOM fragment for a match or near-match of the LSH key. A match would include exact matching of bits for the LSH values of the nodes of the pattern. A near match may include a small hamming distance, for example, in which a specified number of bits in the LSH key may differ, based on a degree of match predetermined by user input. A hamming distance is the number of positions in a fixed length of two strings of characters (or bits) that differ. A hamming distance of two positions may be pre-determined for a LSH key length of 12 bits, for example.

Having used the LSH signature key to search the DOM fragment, outer cluster program 600 determines if a repeated pattern is found at a distant node (decision step 630). A node D, is considered a distant node of a source node S, when node D is outside of an inner cluster and does not exist as a descendant within the sub-tree rooted at the parent node of node S. Outer cluster program 600 determines if a distant node includes a match or near-match of the pattern of the source node.

Determining there to be no matching or near-matching pattern of the distant node and source node, outer cluster program 600 loops to search for a non-visited source node (step 610), and continue as described above.

Determining that the pattern of the distant node is a match or near-match (step 630, "YES" branch), outer cluster program 600 marks as visited, all nodes of the sub-trees rooted at the source node and the distant node, including the root node (step 635).

Having determined matching or near matching patterns between the source node and a distant node, outer cluster program 600 forms two outer clusters and adds the source node and its sub-tree, and the distant node and its sub-tree, to a list of all outer clusters of the DOM (step 640). All events under sub-tree rooted at the source node and all events under the sub-tree rooted at the distant node are included as the nodes are identified as outer clusters. The matching repetitive pattern within the sub-trees of the source node and distant node are static parts of the cluster and the non-repetitive parts are dynamic parts of the sub-tree and executing events within the dynamic parts are more likely to discover a new state of the web site.

For example, referring to FIG. 4, outer cluster program 600, searching the DOM fragment for the shaded pattern of source node div-1 417, child nodes div-4 423, table-1 425, and div-5 427, and sub-tree A 441, rooted at node table-1 425, determines that the pattern rooted at node div-3 435 and including child nodes div-8 443, table-4 445, and div-9 447, and sub-tree A 449 rooted at node table-4 449, is a match. The shaded areas of div-1 and its sub-tree and the shaded areas of div-3 and its sub-tree are determined by outer cluster program 600 to form outer clusters and are added to a list of (outer) clusters stored in a memory component of web indexing server 110.

Having determined the source node and distant node to be outer clusters and adding the respective nodes and their sub-trees to the list of (outer) clusters, and marking the source node and its sub-tree and the distant node and its sub-tree as visited, outer cluster program 600 searches for a non-visited source node (return to step 610), and proceeds as described previously.

Outer cluster program 600, determining that a source node is not located (step 615, "NO" branch), outputs the list of (outer) clusters (step 645). In one embodiment of the present invention, the list of outer clusters is output to be available to web crawling programs, such as web crawling program 160. Web crawling programs use the outer cluster list as an independent DOM, which reduces the search space to explore for a new DOM state. In some embodiments of the present invention, inner cluster information, which identifies repeating structure within an outer cluster, is used by web crawling applications, such as web crawling program 160, to avoid crawling of repetitive or near-repetitive structure of a web site. Subsequent to the output of the list of outer clusters, outer cluster program 600 ends.

Figure 7:
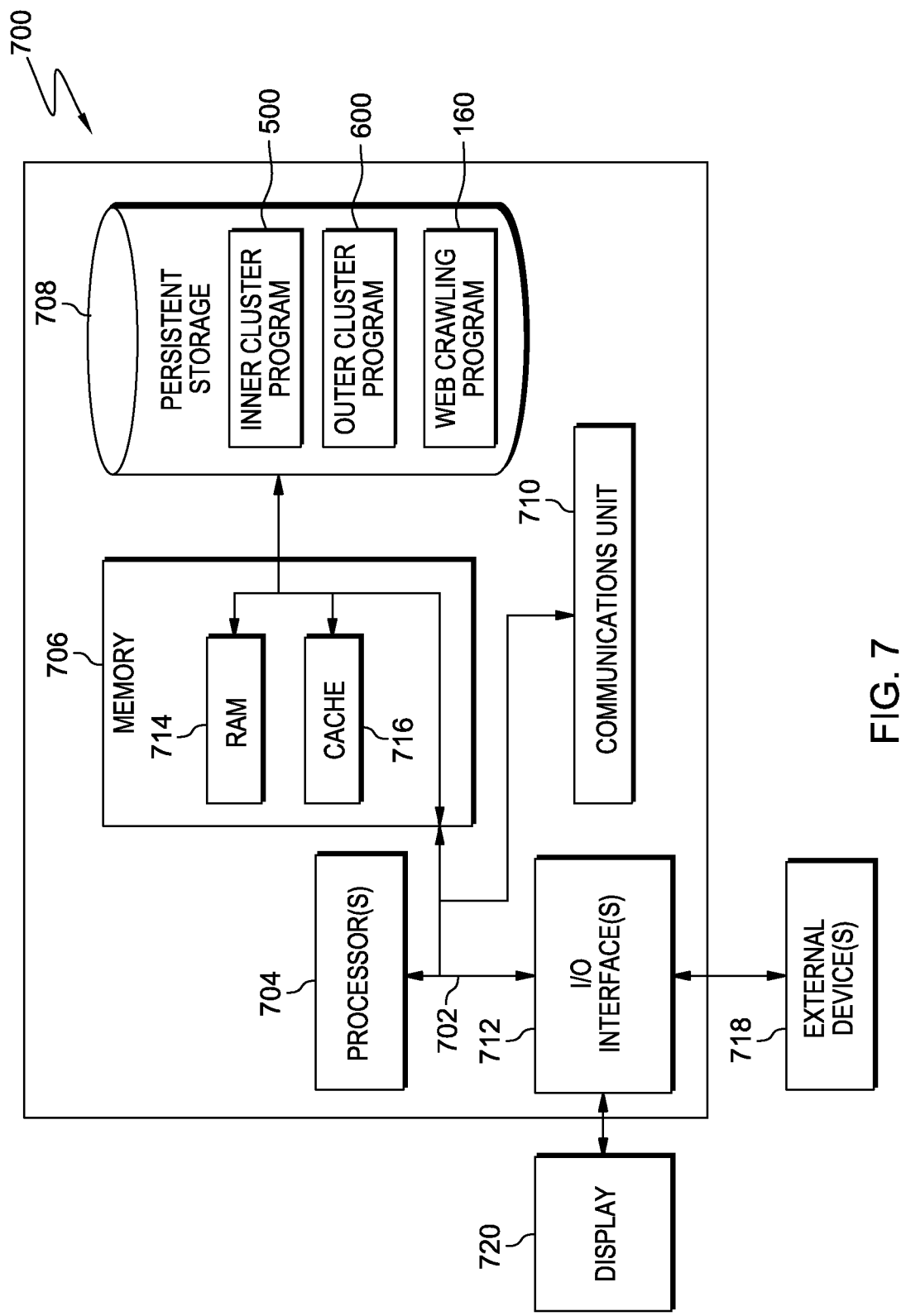
FIG. 7 depicts a block diagram of components of the web indexing server computer capable of executing the inner cluster program and outer cluster program, in accordance with an embodiment of the present invention.

FIG. 7 depicts a block diagram of components of web server system 700 capable of executing inner cluster program 500 and outer cluster program 600, in accordance with an embodiment of the present invention. It should be appreciated that FIG. 7 provides only an illustration of one implementation and does not imply any limitations with regard to the environments in which different embodiments may be implemented. Many modifications to the depicted environment may be made.

Web server system 700 includes communications fabric 702, which provides communications between computer processor(s) 704, memory 706, persistent storage 708, communications unit 710, and input/output (I/O) interface(s) 712. Communications fabric 702 can be implemented with any architecture designed for passing data and/or control information between processors (such as microprocessors, communications and network processors, etc.), system memory, peripheral devices, and any other hardware components within a system. For example, communications fabric 702 can be implemented with one or more buses.

Memory 706 and persistent storage 708 are computer-readable storage media. In this embodiment, memory 706 includes random access memory (RAM) 714 and cache memory 716. In general, memory 706 can include any suitable volatile or non-volatile computer-readable storage media.

Inner cluster program 500 and outer cluster program 600 are stored in persistent storage 708 for execution by one or more of the respective computer processors 704 via one or more memories of memory 706. In this embodiment, persistent storage 708 includes a magnetic hard disk drive. Alternatively, or in addition to a magnetic hard disk drive, persistent storage 708 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer-readable storage medium that is also part of persistent storage 708.

Communications unit 710, in these examples, provides for communications with other data processing systems or devices, including resources of distributed communication processing environment 100. In these examples, communications unit 710 includes one or more network interface cards. Communications unit 710 may provide communications through the use of either or both physical and wireless communications links. Inner cluster program 500 and outer cluster program 600 may be downloaded to persistent storage 408 through communications unit 410.

I/O interface(s) 712 allows for input and output of data with other devices that may be connected to client devices 110 and 120, and conversation hosting server 140. For example, I/O interface 712 may provide a connection to external devices 718 such as a keyboard, keypad, a touch screen, and/or some other suitable input device. External devices 718 can also include portable computer-readable storage media such as, for example, thumb drives, portable optical or magnetic disks, and memory cards. Software and data used to practice embodiments of the present invention, e.g., inner cluster program 500 and outer cluster program 600 can be stored on such portable computer-readable storage media and can be loaded onto persistent storage 708 via I/O interface(s) 712. I/O interface(s) 712 also connect to a display 720.

Display 720 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer program product for identifying redundant structure of asynchronous web content, the computer program product comprising:

a computer readable storage medium having program instructions embodied therewith, wherein the program instructions are executable by a computer processor to cause the computer processor to perform a method comprising:

determining, by a processor, whether a document object model (DOM) includes a repetitive pattern of a combination, the combination including a tag of a leaf node and a tag of a parent node of the leaf node;

responsive to determining the repetitive pattern of the combination, identifying, by the processor, a first inner cluster of a plurality of inner clusters, based on collapsing a set of multiple instances of the repetitive pattern into a first single instance of the repetitive pattern at a level of hierarchy within the DOM, determining, by a processor, whether one or more additional repetitive patterns of a combination is included within the DOM, based on collapsing one or more additional sets of multiple instances of a repetitive pattern of a combination into one or more additional single instances of the repetitive pattern, respectively, at levels of hierarchy within the DOM, until reaching a root node of the DOM;

responsive to determining the one or more additional single instances of the one or more additional repetitive patterns, respectively, the processor identifying one or more additional inner clusters of the plurality of inner clusters;

generating, by the processor, an LSH (locality sensitive hash) signature for the first inner cluster and an LSH signature for the one or more additional inner clusters, based on the first single instance and the one or more additional single instances of the repetitive pattern, respectively;

determining, by the processor, a first outer cluster based on grouping a first set of inner clusters, including the first inner cluster and at least one of the one or more additional inner clusters, into a section rooted at a source node of the DOM, wherein the source node is a parent node of the first set of inner clusters;

determining, by the processor, a second outer cluster, based on grouping a second set of inner clusters from the one or more additional inner clusters, into a section rooted at a distant node of the DOM, wherein the distant node is a parent node of the second set of inner clusters, and is neither a sibling nor a descendent of a sibling of the source node;

responsive to determining that the first outer cluster and the second outer cluster, as a pair of outer clusters, are near repetitive, identifying, by the processor, one outer cluster of the pair of outer clusters that are near repetitive, as redundant content;

wherein:

the pair of outer clusters are near repetitive based on comparing an LSH signature of the source node and an LSH signature of a sub-tree of the source node, to an LSH signature of the distant node of the DOM and an LSH signature of a sub-tree of the distant node.

2. The computer program product of claim 1, wherein the LSH signature for the first inner cluster formed from the first single instance of the repetitive pattern assumes a role as a virtual leaf node of the DOM, and is combined with a parent node of the repetitive pattern to determine additional repetitive patterns within a hierarchical structure of the DOM.

3. The computer program product of claim 1, wherein determining repetitive patterns of the combination of the tag of the leaf node and the tag of the parent node, and generating an LSH signature of the combination of the tag of the leaf node and the tag of the parent node, are repeated at each level of hierarchy of the DOM, by traversing the DOM in a bottom-up manner until a root node of the DOM is reached.

4. The computer program product of claim 1, wherein determining if a pair of outer clusters are near repetitive includes applying a range of matching, which includes a complete match, of an LSH signature to a pre-determined degree of match that indicates a near repetitive match of the LSH signature.

5. The computer program product of claim 1, wherein determining the pair of outer clusters that include one or more inner clusters, further comprises:

traversing the DOM, by the processor, in a top-down manner based on a selection of a source node of the DOM; and searching, by the processor, for a match of the repetitive pattern in the sub-tree of the source node of the DOM, to a repetitive pattern in the sub-tree structure of the distant node of the DOM, based on the LSH signature of the sub-tree of the source node of the DOM and the LSH signature of the sub-tree of the distant node of the DOM, wherein the distant node is not a sibling or a descendant of a sibling of the source node.

6. The computer program product of claim 5, wherein the source node is a root node of the DOM, and each distant node of the DOM is marked as visited subsequent to searching for a near repetitive match of the LSH signature of the source node and the LSH signature of the sub-tree of the source node, to the LSH signature of the distant node and the LSH signature of the sub-tree of the distant node, of the DOM.

7. A computer system for identifying redundant structure of asynchronous web content, the computer system comprising:

one or more computer processors;
one or more computer readable storage media; and
program instructions stored on the computer readable storage media for execution by at least one of the one or more processors, the program instructions comprising:

program instructions to determine whether a document object model (DOM) includes a repetitive pattern of a combination, the combination including a tag of a leaf node and a tag of a parent node of the leaf node;

responsive to determining the repetitive pattern of the combination, program instructions to identify a first inner cluster of a plurality of inner clusters, based on collapsing a set of multiple instances of the repetitive pattern into a first single instance of the repetitive pattern at a level of hierarchy within the DOM;

program instructions to determine whether one or more additional repetitive patterns of a combination is included within the DOM, based on collapsing one or more additional sets of multiple instances of a repetitive pattern of a combination into one or more additional single instances of the repetitive pattern, respectively, at levels of hierarchy within the DOM, until reaching a root node of the DOM;

responsive to determining the one or more additional single instances of the one or more additional repetitive patterns, respectively, program instructions to identify one or more additional inner clusters of the plurality of inner clusters;

program instructions to generate an LSH (locality sensitive hash) signature for the first inner cluster and an LSH signature for the one or more additional inner clusters, based on the first single instance and the one or more additional single instances of the repetitive pattern, respectively;

program instructions to determine a first outer cluster based on grouping a first set of inner clusters, including the first inner cluster and at least one of the one or more additional inner clusters, into a section rooted at a source node of the DOM, wherein the source node is a parent node of the first set of inner clusters;

program instructions to determine a second outer cluster, based on grouping a second set of inner clusters from the one or more additional inner clusters, into a section rooted at a distant node of the DOM, wherein the distant node is a parent node of the second set of inner clusters, and is neither a sibling nor a descendent of a sibling of the source node;

responsive to determining that the first outer cluster and the second outer cluster, as a pair of outer clusters, are near repetitive, program instructions to identify one outer cluster of the pair of outer clusters that are near repetitive, as redundant content;

wherein:

the pair of outer clusters are near repetitive based on comparing an LSH signature of the source node and an LSH signature of a sub-tree of the source node, to an LSH signature of the distant node of the DOM and an LSH signature of a sub-tree of the distant node.

8. The computer system of claim 7, wherein determining repetitive patterns of the combination of the tag of the leaf node and the tag of the parent node, and generating an LSH signature of the combination of the tag of the leaf node and the tag of the parent node, are repeated at each level of hierarchy of the DOM, by traversing the DOM in a bottom-up manner until a root node of the DOM is reached.

9. The computer system of claim 7, wherein determining if a pair of outer clusters are near repetitive includes applying a range of matching, which includes a complete match of an LSH signature to a pre-determined degree of match that indicates a near repetitive match of the LSH signature.

10. The computer system of claim 7, wherein determining the pair of outer clusters that include one or more inner clusters, further comprises:

traversing the DOM, by the processor, in a top-down manner based on a selection of a source node of the DOM; and searching, by the processor, for a match of the repetitive pattern in the sub-tree of the source node of the DOM, to a repetitive pattern in the sub-tree structure of the distant node of the DOM, based on the LSH signature of the sub-tree of the source node of the DOM and the LSH signature of the sub-tree of the distant node of the DOM, wherein the distant node is not a sibling or a descendant of a sibling of the source node.

11. The computer system of claim 7, further comprising:
responsive to determining a match between the LSH signature of the source node and the LSH signature of the sub-tree of the source node, of the DOM, and the LSH signature of the distant node and the LSH signature of the sub-tree of the distant node, of the DOM, program instructions to identify the repetitive pattern of the sub-tree of the distant node to be omitted in web content exploration activity.

12. The computer program product of claim 1, wherein an AJAX exploration algorithm treats an inner cluster of the plurality of inner clusters, as an individual node bounded by an outer cluster, and an outer cluster is treated as independent of another outer cluster, and the pair of outer clusters that are near repetitive are treated as redundant and only one outer cluster of the pair of outer clusters that are near repetitive is explored by the AJAX exploration algorithm.

13. The computer program product of claim 1, further comprising:

retaining, by the processor, names of nodes of the DOM by modifying the DOM;

maintaining, by the processor, a hierarchical position of nodes of the DOM; and reducing, by the processor, noise interference of pattern detection by removing one or more nodes of the DOM that are associated with attributes or context text.

14. The computer program product of claim 7, further comprising:

responsive to determining a match between the repetitive pattern of the source node of the DOM and the repetitive pattern in the sub-tree of the distant node of the DOM, identifying the repetitive pattern of the sub-tree of the distant node to be omitted in web content exploration activity.

15. The computer system of claim 7, wherein an AJAX exploration algorithm treats an inner cluster as an individual node bounded by an outer cluster, and an outer cluster is treated as independent of another outer cluster, and the pair of outer clusters that are near repetitive are treated as redundant and only one outer cluster of the pair of outer clusters that are near repetitive is explored by the AJAX exploration algorithm.

16. The computer system of claim 7, further comprising:
program instructions to retain names of nodes of the DOM by modifying the DOM;

program instructions to maintain a hierarchical position of nodes of the DOM; and program instructions to reduce noise interference of pattern detection by removing one of more nodes of the DOM that are associated with attributes or context text.

17. The computer system of claim 7, wherein the LSH signature of the single instance of the repetitive pattern assumes a role as a virtual leaf node of the DOM, and is combined with a parent node of the repetitive pattern to determine additional repetitive patterns within hierarchical levels of the DOM.

18. The computer system of claim 10, wherein the source node is a root node of the DOM, and each distant node of the DOM is marked as visited subsequent to searching for a near repetitive match of the LSH signature of the source node and the LSH signature of the sub-tree of the source node, to the LSH signature of the distant node and the LSH signature of the sub-tree of the distant node, of the DOM.

* * * * *